US012769931B1

(12) United States Patent
Kissa et al.

(10) Patent No.: US 12,769,931 B1
(45) Date of Patent: Oct. 20, 2026

(54) ENTITY RESOLUTION FOR IMPROVING FIELD PRE-FILL SYSTEMS AND METHODS

(71) Applicant: INTUIT INC., Mountain View, CA (US)

(72) Inventors: Maria Kissa, Mountain View, CA (US); Shirbi Ish-Shalom, Mountain View, CA (US); Fan Li Gabbett, Mountain View, CA (US); Ajith Kuttappan Rajeswari, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 169 days.

(21) Appl. No.: 18/498,983

(22) Filed: Oct. 31, 2023

Related U.S. Application Data

(60) Provisional application No. 63/381,645, filed on Oct. 31, 2022.

(51) Int. Cl.
*G06F 40/174* (2020.01)
*G06F 40/247* (2020.01)
*G06F 40/295* (2020.01)

(52) U.S. Cl.
CPC .......... *G06F 40/174* (2020.01); *G06F 40/247* (2020.01); *G06F 40/295* (2020.01)

(58) Field of Classification Search
None
See application file for complete search history.

(56) References Cited

U.S. PATENT DOCUMENTS 10,572,935 B1 * 2/2020 Murray .................. G06Q 40/00
10,740,561 B1 * 8/2020 Cao ....................... G06F 40/284
11,586,838 B2 * 2/2023 He .......................... G06F 17/18
11,704,387 B2 * 7/2023 Stewart ................... G06F 18/22 382/159
11,720,580 B1 * 8/2023 Hirsch ................ G06F 16/2468 707/723
11,783,338 B2 * 10/2023 Saarenvirta ........ G06Q 20/4016 705/39

(Continued)

OTHER PUBLICATIONS

Toprak et al. "Enhanced Named Entity Recognition algorithm for financial document verification". The Journal of Supercomputing (2023) 79:19431-19451, published May 28, 2023 (Year: 2023).*

*Primary Examiner* — Jesse S Pullias
(74) *Attorney, Agent, or Firm* — DLA PIPER LLP US

(57) ABSTRACT

A processor may receive a labeled entity from a string describing a transaction associated with a user. The processor may apply a layered entity resolution process to the labeled entity. The layered entity resolution process may include checking previous transactions associated with the user for a name of the labeled entity, comparing the labeled entity to a plurality of previously-used names using a fuzzy matching algorithm, identifying a synonym for the labeled entity from previous transactions associated with the user including the synonym, and/or suggesting a high-confidence name for the labeled entity. The layered entity resolution process may generate a predicted identifier for the labeled entity comprising a result of at least one of the checking, the comparing, the identifying, and the suggesting. The processor may insert the predicted identifier into a user interface (UI) element within a UI displayed to the user.

20 Claims, 8 Drawing Sheets

(56) References Cited

U.S. PATENT DOCUMENTS

| | | | | |
|---|---|---|---|---|
| 2009/0198678 | A1* | 8/2009 | Conrad | G06F 16/215<br>707/999.005 |
| 2019/0005533 | A1* | 1/2019 | Smith | G06Q 30/0202 |
| 2019/0205471 | A1* | 7/2019 | Muthuregunathan | G06F 16/3323 |
| 2019/0287116 | A1* | 9/2019 | Karantzis | G06Q 20/4014 |
| 2023/0196453 | A1* | 6/2023 | Shiu | G06Q 40/03<br>705/38 |

* cited by examiner

ENTITY RESOLUTION FOR IMPROVING FIELD PRE-FILL SYSTEMS AND METHODS

CROSS REFERENCE TO RELATED APPLICATIONS

This application is a continuation of U.S. Application Ser. No. 63/381,645 filed Oct. 31, 2022. The above-listed application is incorporated herein by reference in its entirety.

BACKGROUND

One goal of user interface (UI) development is to improve the user experience by providing time-saving and/or value-added features. Improvements of this type can help keep users happy and reduce churn (the rate at which users adopt and subsequently abandon a software product). For online forms, user time savings could potentially be realized by pre-filling as much information as possible. For example, with invoicing, there are line items (e.g., payee name, description, other fields) that can potentially be derived from data sources and pre-filled into a UI form. Automatic systems and methods to obtain such data can be used, but such systems and methods have problems obtaining data when some characteristics of the source data are inconsistent across specific examples.

BRIEF DESCRIPTIONS OF THE DRAWINGS

DETAILED DESCRIPTION OF SEVERAL EMBODIMENTS

Systems and methods described herein improve automatic data gathering for insertion into UI forms. For example, the disclosed systems and methods enable automatic data gathering to extract source data relevant to a given field or form in spite of inconsistencies in the source data.

In a specific, non-limiting example, individuals use accounting software to track payments made by themselves or members of their organization. When a human is entering data into an accounting form, the human can use an almost effortless and unconscious understanding of context and written language to identify a string of characters likely to indicate the name of a payee in a transaction report such as a receipt or a bank record of a payment. Machine-based data recognition and mining systems lack even a rudimentary analog to human mental processing of such written strings, and therefore must use machine-specific techniques to identify information. Embodiments described herein improve such techniques, enhancing and improving automated algorithms for identifying and automatically populating information relevant to a UI form field. Continuing the above example, embodiments herein can identify, extract, parse, and populate payee names from vague and inconsistent character strings. Accordingly, the embodiments described herein improve automated data mining, scraping, and/or form-filling technologies by solving a problem unique to computer-based data mining, scraping, and/or form-filling.

For example, systems and methods described herein can use a layered approach, combining several known and novel processing steps, to resolve and extract data of interest, such as payee name data. These steps can include, but are not limited to, entity recognition pre-processing, user-specific lookups, fuzzy matching, synonym searching, and/or high-confidence recognition. By combining these processing techniques, the disclosed embodiments can deliver far more accurate data recognition and auto-population than prior art systems.

Figure 1:
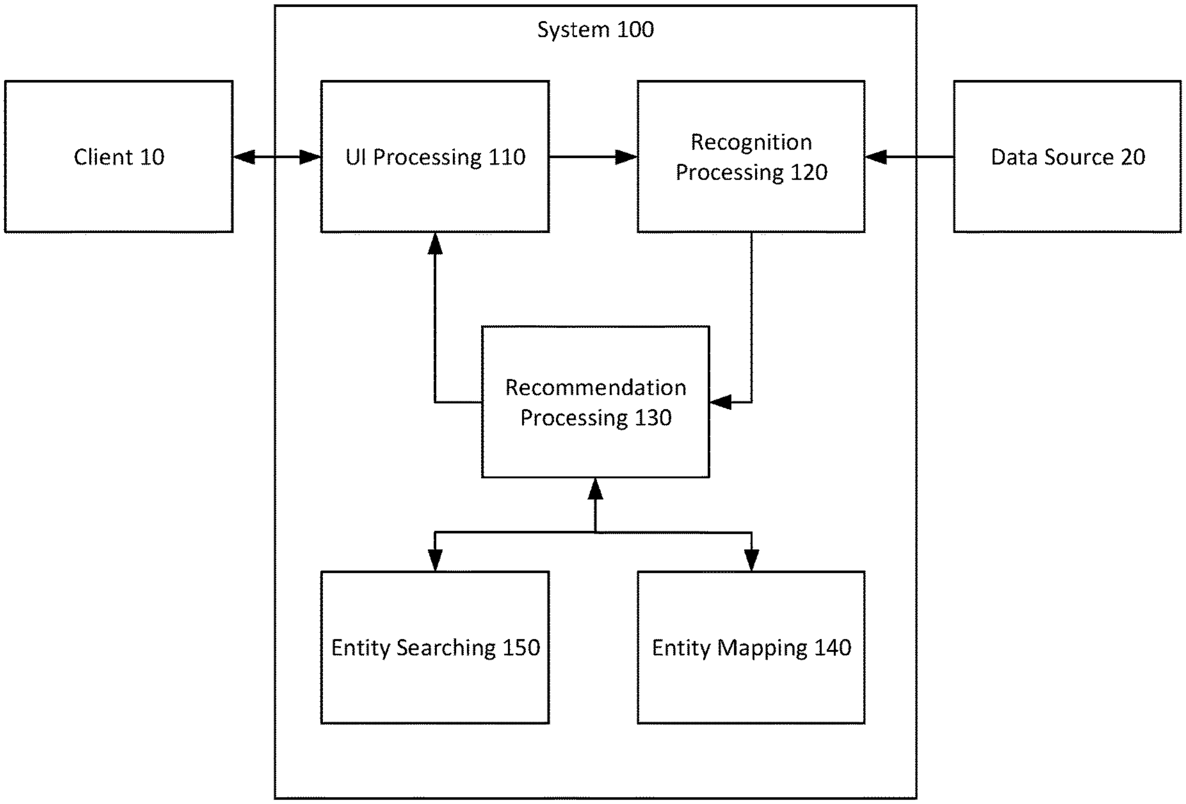
FIG. 1 shows an example field pre-fill system according to some embodiments of the disclosure.

FIG. 1 shows an example field pre-fill system 100 according to some embodiments of the disclosure. System 100 may include a variety of hardware, firmware, and/or software components that interact with one another. Some components may communicate with client(s) 10 through a network (e.g., the Internet, an intranet, and/or one or more networks that provide a cloud environment). Some components may communicate with one another using network 100. Each component may be implemented by one or more computers (e.g., as described below with respect to FIG. 8).

Client 10 can communicate with system 100, such as by interacting with a UI provided by UI processing 110 of system 100. The UI can include forms and/or fields with variable information. UI processing 110 can store entries made by users in the UI (e.g., data entered into fields, documents generated, etc.) and can generate UI elements for presentation to the user by client 10.

As described in detail below, system 100 can perform processing to identify and automatically populate data into UI elements such as data fields, thereby providing pre-filled, user specific information available at runtime. Recognition processing 120 can recognize subsets of data from data source 20 that may be relevant to one or more UI elements. For example, recognition processing 120 can identify a probable named entity (e.g., a name of a payee) in a text string describing a transaction. Recommendation processing 130 can process recognized subsets of data and recommend UI element (e.g., field) entries based thereon (e.g., recommend a standardized name of a transaction payee). Recommendation processing 130 can utilize entity mapping 140 and/or entity searching 150 in order to make the recommendation. Thereafter, UI processing 110 can insert the recommended entries into the relevant UI elements. For example, FIGS. 2-7 illustrate the functioning of the illustrated components in detail.

Elements illustrated in FIG. 1 (e.g., client 10, data source 20, and/or system 100 including UI processing 110, recognition processing 120, recommendation processing 130, entity mapping 140, and/or entity searching 150) are each depicted as single blocks for ease of illustration, but those of ordinary skill in the art will appreciate that these may be embodied in different forms for different implementations. For example, while UI processing 110, recognition processing 120, recommendation processing 130, entity mapping 140, and entity searching 150 are depicted separately, any combination of these elements may be part of a combined hardware, firmware, and/or software element. Likewise, while UI processing 110, recognition processing 120, recommendation processing 130, entity mapping 140, and entity searching 150 are depicted as parts of a single system 100, any combination of these elements may be distributed among multiple logical and/or physical locations. Also, while one client 10, one data source 20, and one system 100 are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. These examples are in the context of identifying likely payees from transaction data and populating invoice UI elements with the identified payee names. This is done within an accounting service UI. However, those of ordinary skill in the art will appreciate that these examples are merely for illustration, and system 100 and its methods of use and operation are extendable to other UI and data contexts.

In the following examples, system 100 can automatically identify payees for users associated with given accounts (e.g., an accounting software user managing invoices for an existing company that may already have payees in their system). Specifically, in this context system 100 can provide functionality such as the following.

System 100 can identify a suitable payee for a transaction based on known user preferences. For example, the user may think of "Chevron" as "Fuel," and several prior invoices may be labeled as such, with payments to "Chevron" being classified as "Fuel." The user may also think of "Exxon" and "Shell" as "Fuel," even though the user had no prior transactions with "Exxon" or "Shell." System 100 can identify these payees as "Fuel" for invoice entry.

When there is no known user preference and no previous payee with an exact name match, system 100 can identify a suitable payee by leveraging common knowledge. For example, it is commonly known that payee "IRS" is suitable for merchant "Internal Revenue Service," payee "AMZN" is suitable for merchant "Amazon," etc. System 100 can include features that automatically recognize these relationships and populate invoices accordingly.

System 100 can recognize misspellings or other mistakes. For example, if payee "7-Elven" exists, system 100 can recognize this as the incorrect spelling for the merchant "7-Eleven" and provide the correct entry for the invoice.

System 100 may automatically create a payee with a name it identifies as a most appropriate name if an existing payee cannot be identified. For example, if a user has a transaction with "Federal Express" with no suitable payee to suggest, system 100 can create the vendor "FedEx" for them.

As described in detail below, all of the above functionalities can be realized through a layered approach that provides accurate automatic UI entry determination when presented with the difficulties discussed above. System 100 can use processing layers including, but not limited to, a name auto-recall layer, a curated list layer (which may include fuzzy matching functionality), and/or a search layer (which may include fuzzy matching functionality). For example, the name auto-recall layer can identify "Fuel" in relation to "Chevron," and the curated list layer can identify "Exxon" as "Fuel" (or a misspelling thereof, such as "Exon"). Likewise, the curated list layer and/or search layer can identify "Amazon" as an entry for "AMZN," create "FedEx" as an entry for "Federal Express," and/or propose "7-Eleven" as an entry for "7-Elven." These layers and other processing are described in relation to the following figures.

Figure 2:
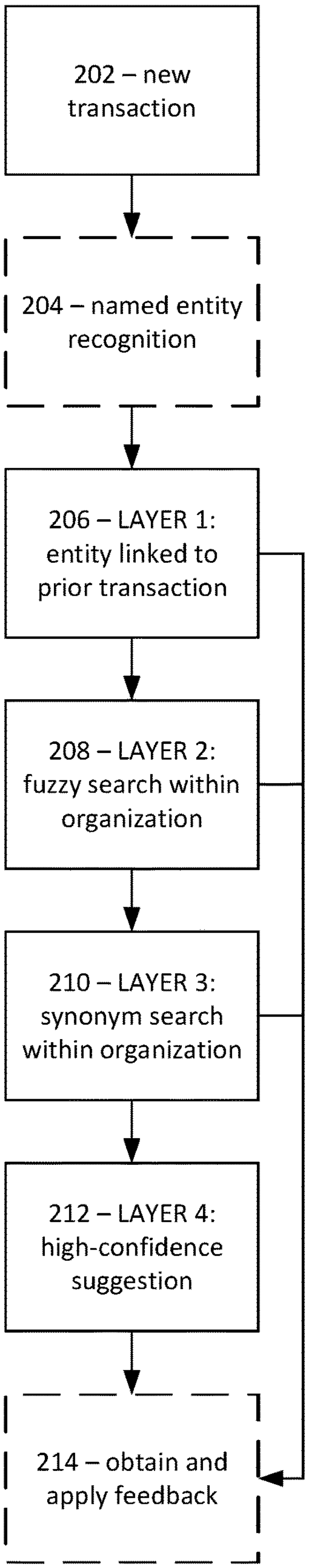
FIG. 2 shows an example entity resolution and pre-fill process according to some embodiments of the disclosure.

FIG. 2 shows an example layered entity resolution and pre-fill process 200 according to some embodiments of the disclosure. System 100 can perform process 200 to analyze transactions and identify and suggest pre-fill data for insertion into a UI. Process 200 is a layered approach whereby multiple processing layers provide highly accurate pre-fill options.

At 202, system 100 can receive new transaction data. The transaction data can be in the form of one or more strings of text or other characters that include, perhaps among other things, information describing a transaction. The following are some non-limiting examples of transaction data.

Customer Payload Sample from Square:

```
{
  "customers": [
    {
      "id": "JDKYHBWT1D4F8MFH63DBMEN8Y4",
      "created_at": "2016-03-23T20:21:54.859Z",
      "updated_at": "2016-03-23T20:21:55Z",
      "given_name": "Amelia",
      "family_name": "Earhart",
      "email_address": "Amelia.Earhart@example.com",
      "address": {
        "address_line_1": "500 Electric Ave",
        "address_line_2": "Suite 600",
        "locality": "New York",
        "administrative_district_level_1": "NY",
        "postal_code": "10003",
        "country": "US"
      },
      "phone_number": "1-212-555-4240",
      "reference_id": "YOUR_REFERENCE_ID",
      "note": "a customer",
      "groups": [
        {
          "id": "545AXB44B4XXWMVQ4W8SBT3HHF",
          "name": "Aviation Enthusiasts"
        },
        {
          "id": "1KB9JE5EGJXCW.REACHABLE",
          "name": "Reachable"
        }
      ],
      "group_ids": [
        "545AXB44B4XXWMVQ4W8SBT3HHF"
      ],
      "segment_ids": [
        "1KB9JE5EGJXCW.REACHABLE"
      ]
    }
  ]
}
```

Here, the customer name to be identified by system 100 is Amelia Earhart.

Bank Transaction Payload Sample from Plaid:

```
{
  "accounts": [{Object}],
  "transactions": [{
    "account_id": "vokyE5Rn6vHKqDLRXEn5fne7LwbKPLIXGK98d",
    "amount": 2307.21,
    "iso_currency_code": "USD",
    "unofficial_currency_code": null,
    "category": [
```

-continued

"Shops",
"Computers and Electronics"
],
"category_id": "19013000",
"date": "2017-01-29",
"authorized_date": "2017-01-27",
"location": {
"address": "300 Post St",
"city": "San Francisco",
"region": "CA",
"postal_code": "94108",
"country": "US",
"lat": null,
"lon": null,
"store_number": "1235"
},
"name": "Apple Store",
"payment_meta": Object,
"payment_channel": "in store",
"pending": false,
"pending_transaction_id": null,
"account_owner": null,
"transaction_id": "lPNjeW1nR6CDn5okmGQ6hEpMo4ILNoSrzqDje",
"transaction_code": null,
"transaction_type": "place"
}, {
"account_id": "XA96y1wW3xS7wKyEdbRzFkpZov6x1ohxMXwep",
"amount": 78.5,
"iso_currency_code": "USD",
"unofficial_currency_code": null,
"category": [
"Food and Drink",
"Restaurants"
],
"category_id": "13005000",
"date": "2017-01-29",
"authorized_date": "2017-01-28",
"location": {
"address": "262 W 15th St",
"city": "New York",
"region": "NY",
"postal_code": "10011",
"country": "US",
"lat": 40.740352,
"lon": -74.001761,
"store_number": "455"
},
"name": "Golden Crepes",
"payment_meta": Object,
"payment_channel": "in store",
"pending": false,
"pending_transaction_id": null,
"account_owner": null,
"transaction_id": "4WPD9vV5A1cogJwyQ5kVFB3vPEmpXPS3qvjXQ",
"transaction_code": null,
"transaction_type": "place"
}],
"item": {Object},
"total_transactions": Number,
"request_id": "45QSn"
}

Here, the customer names to be identified by system 100 are Apple Store and Golden Crepes.

Customer Payload Sample from eBay Order:

{"shippingAddress": {
"addressLine1": "19500 Pruneridge Ave",
"addressLine2": "Apt 7109",
"city": "Cupertino",
"stateOrProvince": "CA",
"postalCode": "95014-6729",
"country": "US", -continued "recipient": "Giridhar Desaraju",
"phoneNumber": "4088575558"
}
}

Here, the customer name to be identified by system 100 is Giridhar Desaraju.

Customer Payload Sample from Clover Customer API:

```
{
  id:string
  merchant:{
    id:string
  }
  firstName:string
  lastName:string
  marketingAllowed:true
  customerSince:0
  addresses:[
  {
    address1 :string
    address2:string
    address3:string
    city:string
    country:string
    phoneNumber:string
    state:string
    zip:string
  }
  ]
  emailAddresses:[
  {
    id:string
    emailAddress:string
    verifiedTime:0
    primaryEmail:true
  }
  ]
  phoneNumbers:[
  {
    id:string
    phoneNumber:string
  }
  ]
}
```

Here, the customer name to be identified by system 100 is the combination of firstName string and IastName string.

IDX Bank Transaction Sample:

```
{
    "transactionId":"urn:transaction:fdp:transactionid:893d39bb-fe72-11eb-b60a-
22c355d574d8",
  "amount":-126.55,
  "categoryId":"10",
  "categoryName":"Clients",
  "currency":"EUR",
  "L10_provider_description":"FACEBK U382B3739 FB.ME/ADS"
  "description":"Facebook",
  "merchant":"Facebook",
  "merchantCity":"Adã ©",
  "merchantCountry":"France",
  "merchantId":"10060",
  "merchantStreet":"883d5a59-fc62-4e32-b2b5-f369b7078128",
  "postedDate":"2021-07-29T22:00:00Z",
  "scheduleC":"Advertising",
  "scheduleCId":"10001",
  "standardIndustrialClassificationCode":"7379",
  "status":"Posted",
  "transactionDate":"2021-06-29T22:00:00Z",
  "transaction Type":"DEBIT",
  "financialInstitutionTransactionId":"R012118144870f80190ad559",
}
```

Here, the customer name to be identified by system 100 is Facebook.

Receipt Data Sample:

```
{
"errorMessage": null,
"fourFieldConf": 0.9702103137969971,
```

-continued

```
"jobStatus": "complete",
"results": {
  "fdpReceiptV2": {
    "metadata": {
      "totalAmount": {
        "currency": {
          "rawValue": "USD"
        },
        "value": {
          "confidence": 0.9912133812904358,
          "rawValue": "40.25"
        }
      },
      "transaction": {
        "creditCardDigits": {
          "confidence": 0.9969310760498047,
          "rawValue": ""
        },
        "date": {
          "confidence": 0.9939272403717041,
          "rawValue": "2016-03-12"
        }
      },
      "vendor": {
        "store": {
          "name": {
            "confidence": 0.9893597364425659,
            "rawValue": "sangeetha"
          }
        }
      }
    },
    "totalAmount": {
      "value": "40.25"
    },
    "transaction": {
      "creditCardDigits": "",
      "date": "2016-03-12"
    },
    "vendor": {
      "store": {
```

-continued

```
          "name": "sangeetha"
        }
      }
    }
```

-continued

```
        },
        "threeFieldConf": 0.9811524152755737
    }
```

Here, the customer name to be identified by system 100 is Sangeetha.

As those of ordinary skill will appreciate, system 100 can be equipped with any interfacing software and/or hardware useful for obtaining transaction data of the above forms or in other forms from data source 20. For example, system 100 can include APIs, network hardware/software, etc., by which it can obtain transaction data.

At 204, system 100 can performed named entity recognition (NER) processing (e.g., performing labeling by applying a NER model) on the data received at 202 in embodiments wherein the data received at 202 was not already labeled, thereby labeling a labeled entity for further processing.

NER can identify content of the data obtained at 202 using a machine learning (ML) process. This can be a natural language processing (NLP) process trained to identify variable elements, such as dates, names, and/or combinations thereof in the present example. In some embodiments, the ML process may be a NER algorithm such as spaCy, NLTK, open NLP, etc. The ML process may use grammar-based rules to identify specific types of content. The ML process may use one or more models (e.g., supervised learning ML models) trained to identify one or more specific types of content. In some cases, recognition processing 120 may use bidirectional encoder representations from transformers (BERT) as an ML process for performing NER. For example, a BERT model can be trained to recognize dates, names, or any content of interest.

Using NER, recognition processing 120 thereby can identify at least one likely entity name (e.g., possible payee name) in the transaction data. For example, recognition processing 120 can identify "Exxon," "7-Elven," "AMZN," "Federal Express," or any of the other examples discussed herein or other entities.

With entity name(s) identified within the transaction data, system 100 can process the entity using a layered entity resolution process to produce an accurate pre-fill option for insertion into the UI. The remainder of FIG. 2 summarizes an example layered entity resolution process, with specific processing performed at each layer described in detail with respect to subsequent figures. System 100 can use recommendation processing 130, entity mapping 140, and/or entity searching 150 to process each layer using one or more sources of data about possible entity names to use as UI element suggestions. Data sources may include, but are not limited to, lists of vendorIDs based on previous preferences, a rollup vendor list developed through previously expressed user preference (e.g., "Gas" instead of Arco and Chevron), custom vendor lists (e.g., personal vendors (local contractors) searchable through exact or fuzzy matching), global vendor lists (e.g., Costco, Walmart, etc., searchable through exact or fuzzy matching), and/or local vendor lists (e.g., vendors local to an area such as mom and pop shops searchable through exact or fuzzy matching). As FIG. 2 is an example, it may be possible to arrange layers differently and/or add or remove layers in various embodiments. However, the following layers are representative of how system 100 can identify accurate pre-fill options, and they reflect an implementation of at least one embodiment of system 100.

At 206, system 100 can apply a first layer of entity resolution and pre-fill processing. At this layer, system 100 can attempt to identify the entity in one or more prior transactions by the current user or organization. For example, this can include checking previous transactions associated with the user for a name of the labeled entity. An example is described below with respect to FIG. 3. If a candidate for pre-fill is identified at this layer, system 100 can present the candidate for inclusion in the UI element and omit subsequent layers.

At 208, system 100 can apply a second layer of entity resolution and pre-fill processing. At this layer, system 100 can look for near matches within one or more prior transactions by the current user or organization. For example, this can include comparing the labeled entity to a plurality of previously used names using a fuzzy matching algorithm. An example is described below with respect to FIG. 4. If a candidate for pre-fill is identified at this layer, system 100 can present the candidate for inclusion in the UI element and omit subsequent layers.

At 210, system 100 can apply a third layer of entity resolution and pre-fill processing. This can include performing a synonym search that can identify a synonym for the labeled entity from previous transactions associated with the user including the synonym. An example is described below with respect to FIG. 5. If a candidate for pre-fill is identified at this layer, system 100 can present the candidate for inclusion in the UI element and omit subsequent layers.

At 212, system 100 can apply a fourth layer of entity resolution and pre-fill processing. This can include suggesting a high-confidence name for the labeled entity (e.g., selected from a database of high-confidence names). An example is described below with respect to FIG. 6. As this is the final layer in this embodiment, a high-confidence name can be selected as the pre-fill candidate and/or no candidate can be presented if no high confidence name is available.

At 214, system 100 can obtain and apply feedback on the suggested pre-fill data in some embodiments. As a result of the layered processing at 206-212, system 100 can generate a predicted identifier for the labeled entity comprising a result returned by processing by at least one of the layers. UI processing 110 can insert the predicted identifier into a UI element within a UI displayed to the user by client 10. The user may have the option to accept the predicted identifier or reject it and replace it with a different entity name. In either case, UI processing 110 may record the user's action and use it as feedback for the layered entity resolution process, for example by adjusting the confidence score of the predicted identifier upwards when it is accepted and downwards when it is rejected. In other words, in response to receiving feedback from the UI element indicating that the predicted identifier is correct, system 110 can update data associated with at least one of the previous transactions, previously used names, and high-confidence names to improve a ranking of the result.

In some embodiments, a confidence score can be calculated based on the accept/reject rate found in feedback by users of system 110. For example, system 110 can suggest an initial score based on any known or novel scoring function (e.g., ElasticSearch's default scoring function—"Practical Scoring Function" which is based on Term Frequency (tf) and Inverse Document Frequency (idf)). The feedback impacts the score positively or negatively based on accept/reject action respectively. The impact can be calculated based on a percentage and the system use/reject based on a threshold value.

Figure 3:
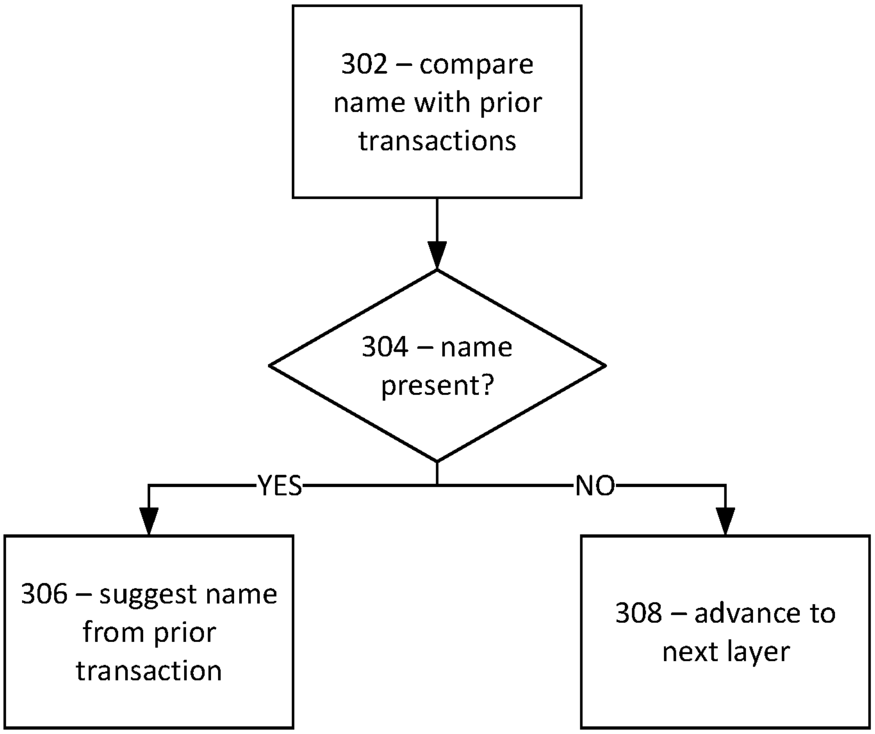
FIG. 3 shows an example entity matching process according to some embodiments of the disclosure.

FIG. 3 shows an example entity matching process 206 according to some embodiments of the disclosure. In the illustrated embodiment, entity matching process 206 constitutes a first layer of the layered entity resolution and pre-fill process 200.

The first layer is an entity matching process whereby the labeled entity found by the named entity resolution processing is compared with names previously used in transactions by the user or the user's organization. At 302, system 100 (e.g., recommendation processing 130 and entity searching 150) can search for the labeled entity in a database or other data set of prior transactions. For example, the search can be run against previously created invoices of the user or organization. At 304, recommendation processing 130 can determine whether an exact match was found by entity searching 150. If so, at 306, recommendation processing 130 can provide the matching name as the predicted identifier for inclusion in the UI element. If not, at 308, processing can advance to the next layer.

In some embodiments, system 100 can identify an exact match but return an alias based on past usage. For example, if merchant "Arco" is used as payee "Arco" 5 times in the searched transaction history and as "Gas" 30 times in the searched transaction history, system 100 can return payee "Gas" should be set as a first suggestion, with "Arco" appearing as a secondary suggestion if at all.

Figure 4:
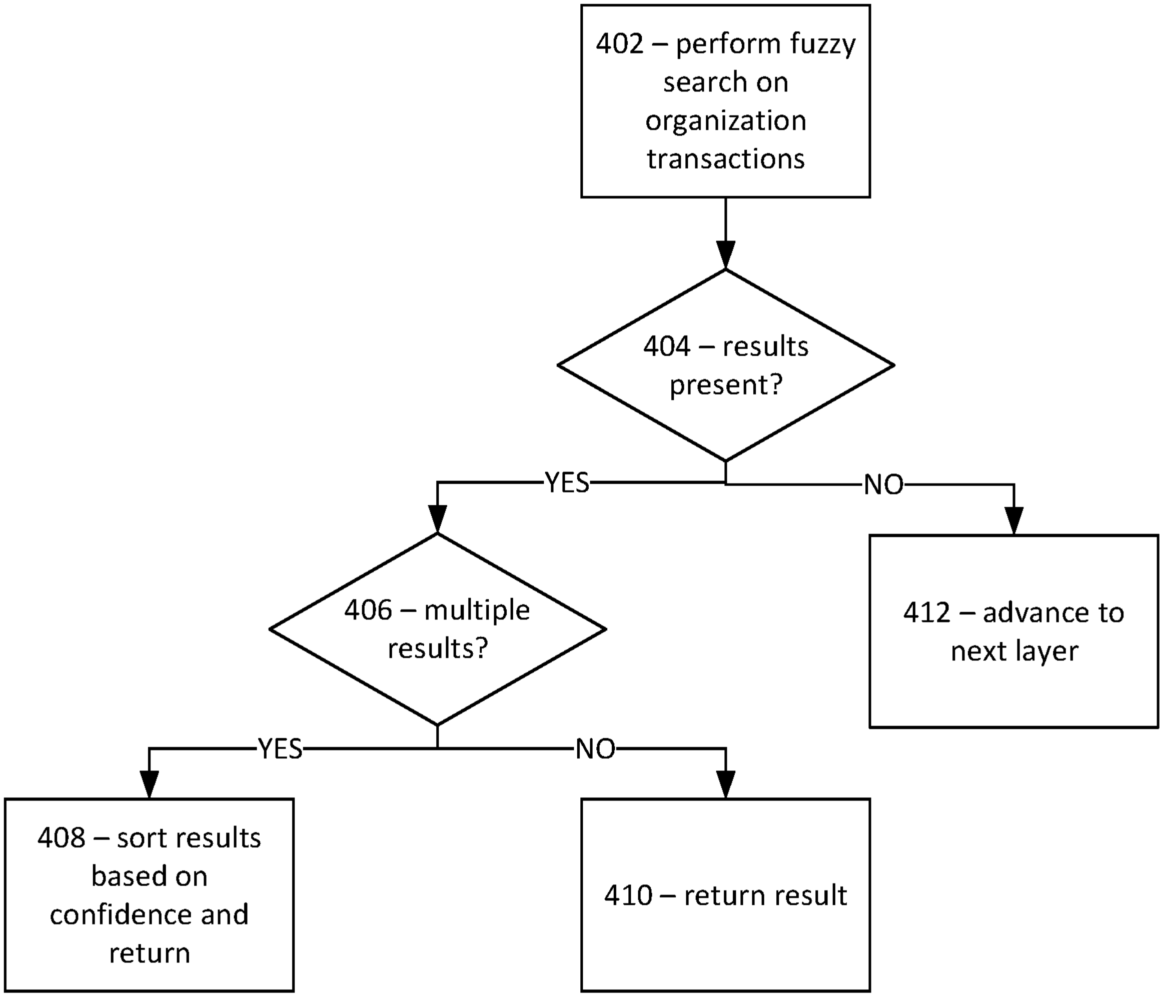
FIG. 4 shows an example name search process according to some embodiments of the disclosure.

FIG. 4 shows an example name search process 208 according to some embodiments of the disclosure. In the illustrated embodiment, name search process 208 constitutes a second layer of the layered entity resolution and pre-fill process 200.

The second layer can include a name search process wherein system 100 (e.g., recommendation processing 130 and entity searching 150) can determine edit distances between the labeled entity and one or more names in previous transactions where there are slight differences in the names, for example due to a misspelling, or different format than expected within a transaction string, or the like.

"Edit distance" is often used to refer to a Levenshtein distance, which is a method of measuring an amount of difference between two sequences and is the minimum number of edits needed to transform one string into the other using limited types of operations (e.g., insertion, deletion, or substitution of a single character). For example, the Levenshtein distance between "kitten" and "sitting" is 3, since the following three edits change one sequence into the other: kitten?sitten (substitution of 's' for 'k'), sitten?sittin (substitution of 'i' for 'e'), sittin?sitting (insertion of 'g' at the end). Other types of known edit distance determinations include, for example, the Damerau-Levenshtein distance, which allows addition, deletion, substitution, and the transposition of two adjacent characters, and the Hamming distance, which allows only substitution (and hence, only applies to strings of the same length). Accordingly, while Levenshtein distance is used herein as an example, other embodiments may use other types of edit distance determinations.

At 402, entity searching 150 can perform a fuzzy search on previous transactions by the user or organization, for example using an edit distance at or below some threshold value (e.g., a Levenshtein distance of 2). In other words, system 100 can determine respective edit distances between the labeled entity and respective ones of the plurality of previously-used names. At 404, recommendation processing 130 can determine whether results are present in the search results. If there are multiple results at 406, recommendation processing 130 can sort the results based on confidence and return the list with confidence values, whereas if only one result is present, at 410, recommendation processing 130 can return the single result. Confidence values can be based on edit distance, for example at least some of the plurality of previously-used names may be ranked from lowest to highest edit distance. In any event, if results are found, one or more highest-ranked previously-used names can be returned as the result used as the predicted identifier. Alternatively, if no results were found by the search, at 412, processing can advance to the next layer.

In some embodiments, system 100 can identify a near match but return an alias based on past usage. For example, if merchant "Arco" (identified from a fuzzy search of "ARC") is used as payee "Arco" 5 times in the searched transaction history and as "Gas" 30 times in the searched transaction history, system 100 can return payee "Gas" should be set as a first suggestion, with "Arco" appearing as a secondary suggestion if at all.

Figure 5:
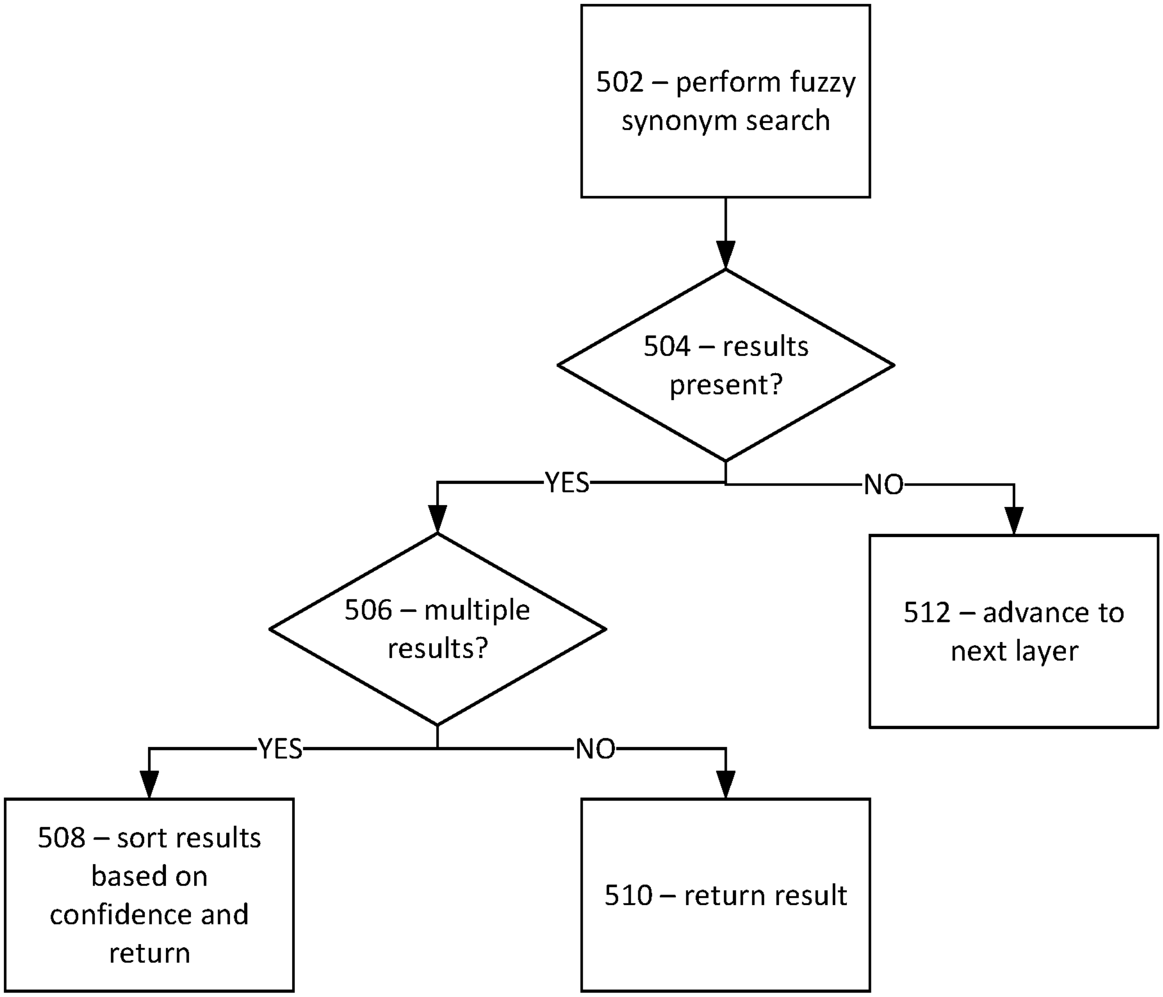
FIG. 5 shows an example synonym search process according to some embodiments of the disclosure.

FIG. 5 shows an example synonym search process 210 according to some embodiments of the disclosure. In the illustrated embodiment, synonym search process 210 constitutes a third layer of the layered entity resolution and pre-fill process 200.

The third layer can include a synonym search process wherein system 100 (e.g., recommendation processing 130 and entity searching 150) can identify synonyms (e.g., "IRS" is synonymous with "Internal Revenue Service," "AMZN" is synonymous with "Amazon," etc.) through fuzzy searching similar to the searching of the second layer in combination with confidence scoring on the likelihood of a term being a synonym for the labeled entity.

At 502, entity searching 150 can perform a fuzzy search for synonymous descriptions of the labeled entity that have been used on previous transactions by the user or organization. For example, the synonymous descriptions can be generated from a source of knowledge such as anonymized previous transactions by all users or a subset thereof. In this case, if a number of users above a threshold use a term as a synonym for another, the term can be added to a list of synonyms (e.g., if 1000 users use "Internal Revenue Service" for "IRS," it can be added to a source of truth as a synonym for "IRS"). At 504, recommendation processing 130 can determine whether results are present in the search results. If there are multiple results at 506, recommendation processing 130 can sort the results based on confidence and return the list with confidence values, whereas if only one result is present, at 510, recommendation processing 130 can return the single result. Confidence values can be based on standard usage, for example at least some of the plurality of previously-used names may be ranked from lowest to highest based on how frequently they have been used in past transactions. In any event, if results are found, one or more highest-ranked previously-used names can be returned as the result used as the predicted identifier. Alternatively, if no results were found by the search, at 512, processing can advance to the next layer.

Figure 6:
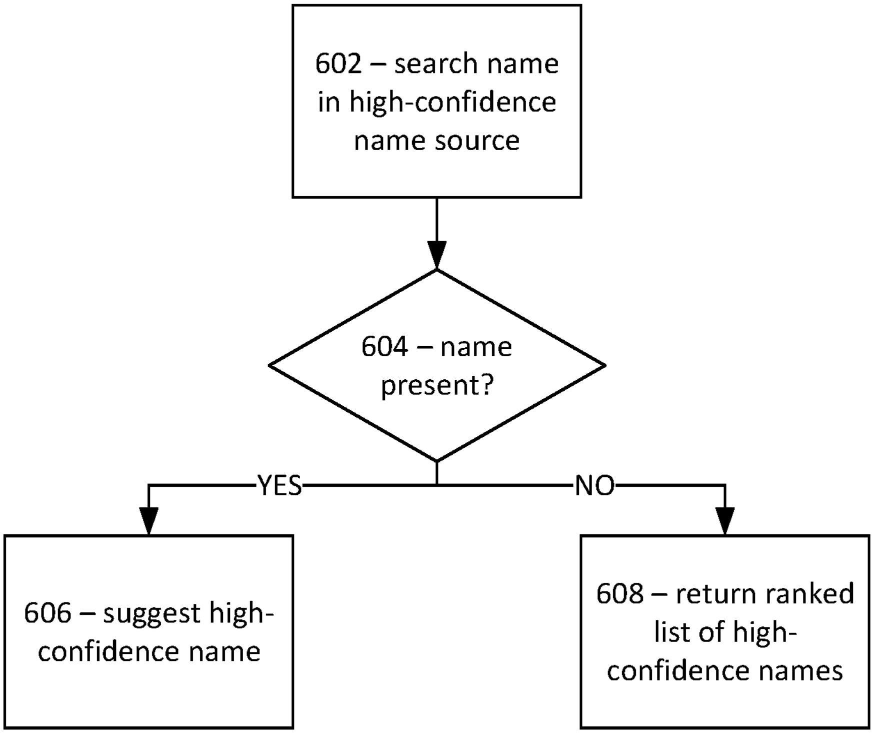
FIG. 6 shows an example high-confidence suggestion process according to some embodiments of the disclosure.

FIG. 6 shows an example high-confidence suggestion process 212 according to some embodiments of the disclosure. In the illustrated embodiment, high-confidence suggestion process 212 constitutes a fourth layer of the layered entity resolution and pre-fill process 200.

At 602, entity searching 150 can perform a fuzzy search within a high-confidence name data source including names known to be frequently used within transactions (e.g., frequent payees). Any source of truth can be used as the high-confidence name data source, including, but not limited to, anonymized records of transactions of all users of a transaction platform. The search can return a direct match as in the first layer, a fuzzy match as in the second layer, and/or a synonym match as in the third layer. At 604, recommendation processing 130 can determine whether results are present in the search results. If there is only one result present, at 606, recommendation processing 130 can return the single result. If there are multiple results at 610, recommendation processing 130 can sort the results based on confidence and return the list with confidence values. Confidence values can be based on edit distance and/or frequency of occurrence in transactions, for example.

Figure 7:
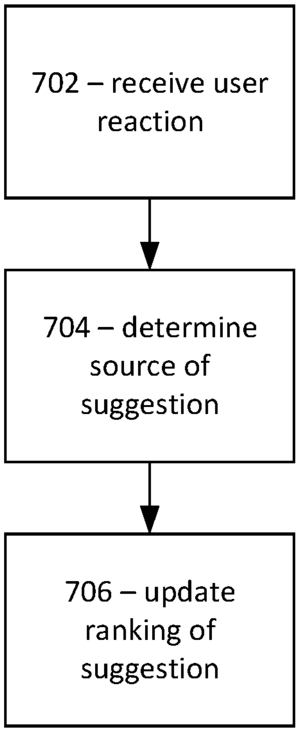
FIG. 7 shows an example feedback process according to some embodiments of the disclosure.

FIG. 7 shows an example feedback process 214 according to some embodiments of the disclosure. After one or more predicted identifiers are generated at any of the above layers, UI processing 110 can provide the predicted identifiers to client 10 within a UI being presented to a user by client 10. The predicted identifiers are suggested as pre-fill options for the UI element. If a user selects a predicted identifier for insertion into the UI element (e.g., selects a suggested payee for an invoice), or if the user declines the suggestions, feedback process 214 can capture this result to improve future suggestions.

At 702, UI processing 110 can receive a user reaction. For example, client 10 can send information to UI processing 110 indicating whether any of the predicted identifiers were selected by the user or if no predicted identifiers were selected by the user. At 704, entity mapping 150 can determine the source of the predicted identifier (e.g., which layer was used to generate the predicted identifier). At 706, entity mapping 150 can update the ranking(s) of the predicted identifier(s), for example by improving the confidence score of a selected identifier and/or reducing confidence scores of non-selected identifiers.

Figure 8:
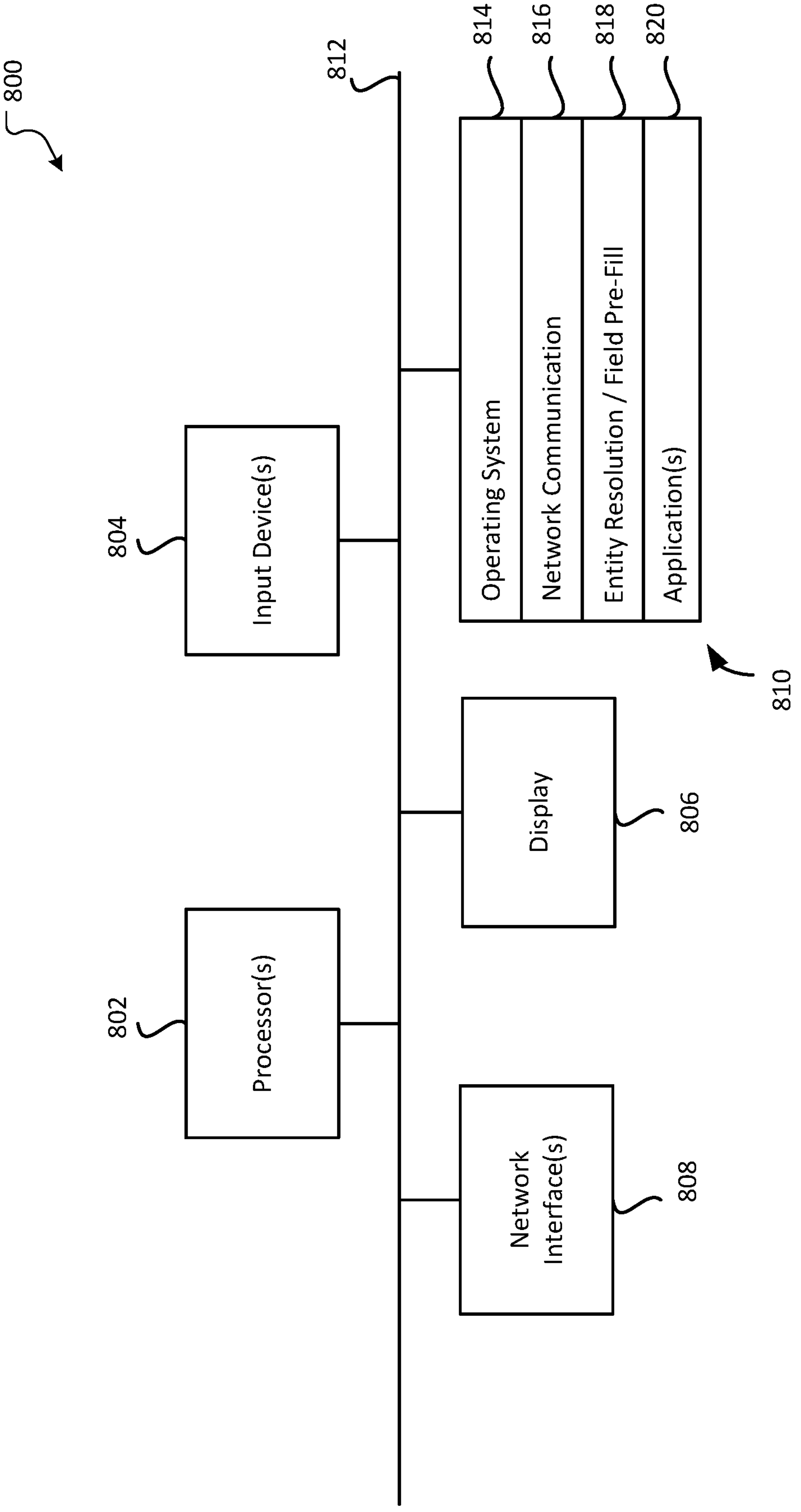
FIG. 8 shows a computing device according to some embodiments of the disclosure.

FIG. 8 shows a computing device 800 according to some embodiments of the disclosure. For example, computing device 800 may function as system 100 or any portion(s) thereof, or multiple computing devices 800 may function as system 100.

Computing device 800 may be implemented on any electronic device that runs software applications derived from compiled instructions, including without limitation personal computers, servers, smart phones, media players, electronic tablets, game consoles, email devices, etc. In some implementations, computing device 800 may include one or more processors 802, one or more input devices 804, one or more display devices 806, one or more network interfaces 808, and one or more computer-readable mediums 810. Each of these components may be coupled by bus 812, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, and touch-sensitive pad or display. Bus 812 may be any known internal or external bus technology, including but not limited to ISA, EISA, PCI, PCI Express, NuBus, USB, Serial ATA or FireWire. In some embodiments, some or all devices shown as coupled by bus 812 may not be coupled to one another by a physical bus, but by a network connection, for example. Computer-readable medium 810 may be any medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 810 may include various instructions 814 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 may establish and maintain network connections (e.g., software for implementing communication protocols, such as TCP/IP, HTTP, Ethernet, telephony, etc.).

Entity resolution/field pre-fill 818 may include the system elements and/or the instructions that enable computing device 800 to perform the processing of system 100 as described above, including, but not limited to, UI processing 110, recognition processing 120, recommendation processing 130, entity searching 140, and/or entity mapping 150. Application(s) 820 may be an application that uses or implements the outcome of processes described herein and/or other processes. For example, application(s) 820 may incorporate the UI and/or UI elements created by system 100 as described above, such as by providing an invoicing UI that uses suggested payee names generated by the processing described above. In some embodiments, the various processes may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks;

magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

extracting, by a processor, a transaction payload from a transaction processing system, the transaction payload comprising a labeled entity from a string describing a transaction associated with a user;

applying, by the processor, a layered entity resolution process to the transaction payload, the layered entity resolution process comprising performing processing of a plurality of successive layers until at least one of the layers produces a predicted identifier for the labeled entity, the processing of the plurality of successive layers comprising at least two of:

a first layer comprising processing the transaction payload comprising the labeled entity using a named entity recognition machine learning model configured to detect a name of the labeled entity, a second layer comprising processing the transaction payload comprising the labeled entity using a fuzzy matching algorithm configured to detect a fuzzy match to at least one of a plurality of previously-used names, a third layer comprising processing the transaction payload comprising the labeled entity using a fuzzy matching algorithm configured to detect a fuzzy match to a synonym for the labeled entity from previous transactions associated with the user including the synonym, and a fourth layer comprising searching a high-confidence name data source for at least one of a direct match and a fuzzy match between at least a portion of the string and a high-confidence name within the high-confidence data source, wherein the layered entity resolution process ends in response to the producing of the predicted identifier; and inserting, by the processor, the predicted identifier into a user interface (UI) element within a UI displayed to the user.

2. The method of claim 1, further comprising:

receiving, by the processor, the transaction payload; and labeling, by the processor, the labeled entity in the transaction payload.

3. The method of claim 2, wherein the labeling is performed by applying a named entity recognition model.

4. The method of claim 1, wherein the first layer comprises:

identifying, by the processor, an exact match between the labeled entity and the name within the previous transactions; and returning, by the processor, the name as the result used as the predicted identifier.

5. The method of claim 1, wherein the second layer comprises:

determining, by the processor, respective edit distances between the labeled entity and respective ones of the plurality of previously-used names;

ranking, by the processor, at least some of the plurality of previously-used names from lowest to highest edit distance; and returning, by the processor, one or more highest-ranked previously-used names as the result used as the predicted identifier.

6. The method of claim 5, wherein determining the respective edit distances comprises determining Levenshtein distances below a threshold value.

7. The method of claim 1, wherein the third layer comprises:

determining, by the processor, a synonymous description of the labeled entity;

detecting, by the processor, at least one instance of the synonymous description in at least one of the previous transactions; and returning, by the processor, the synonymous description as the result used as the predicted identifier.

8. The method of claim 1, wherein the fourth layer comprises at least one of:

identifying, by the processor, the labeled entity in an entry of a high-confidence name data source and returning the entry;

identifying, by the processor, a candidate by fuzzy matching with the high-confidence name data source, the identifying of the candidate comprising:

determining, by the processor, respective edit distances between the labeled entity and respective entries from the high-confidence name data source;

ranking, by the processor, at least some of the respective entries from lowest to highest edit distance; and returning, by the processor, one or more highest-ranked previously-used names as the result used as the candidate; and returning, by the processor, the entry or the candidate as the result used as the predicted identifier.

9. The method of claim 8, wherein determining the respective edit distances comprises determining Levenshtein distances below a threshold value.

10. The method of claim 1, further comprising:

receiving, by the processor, feedback from the UI element indicating that the predicted identifier is correct; and updating, by the processor, data associated with at least one of the previous transactions, previously-used names, and high-confidence names to improve a ranking of the result.

11. A system comprising:

a processor; and a non-transitory memory in communication with the processor and storing instructions that, when executed by the processor, cause the processor to perform processing comprising:

extracting a transaction payload from a transaction processing system, the transaction payload comprising a labeled entity from a string describing a transaction associated with a user;

applying a layered entity resolution process to the transaction payload, the layered entity resolution process comprising performing processing of a plurality of successive layers until at least one of the layers produces a predicted identifier for the labeled entity, the processing of the plurality of successive layers comprising at least two of:

a first layer comprising processing the transaction payload comprising the labeled entity using a named entity recognition machine learning model configured to detect a name of the labeled entity, a second layer comprising processing the transaction payload comprising the labeled entity using a fuzzy matching algorithm configured to detect a fuzzy match to at least one of a plurality of previously-used names, a third layer comprising processing the transaction payload comprising the labeled entity using a fuzzy matching algorithm configured to detect a fuzzy match to a synonym for the labeled entity from previous transactions associated with the user including the synonym, and a fourth layer comprising searching a high-confidence name data source for at least one of a direct match and a fuzzy match between at least a portion of the string and a high-confidence name within the high-confidence data source, wherein the layered entity resolution process ends in response to the producing of the predicted identifier; and returning the predicted identifier to a client device for insertion into a user interface (UI) element within a UI displayed to the user.

12. The system of claim 11, wherein the processing further comprises:

receiving the transaction payload; and labeling the labeled entity in the transaction payload.

13. The system of claim 11, wherein the first layer comprises:

identifying an exact match between the labeled entity and the name within the previous transactions; and returning the name as the result used as the predicted identifier.

14. The system of claim 11, wherein the second layer comprises:

determining respective edit distances between the labeled entity and respective ones of the plurality of previously-used names;

ranking at least some of the plurality of previously-used names from lowest to highest edit distance; and returning one or more highest-ranked previously-used names as the result used as the predicted identifier.

15. The system of claim 11, wherein the third layer comprises:

determining a synonymous description of the labeled entity;

detecting at least one instance of the synonymous description in at least one of the previous transactions; and returning the synonymous description as the result used as the predicted identifier.

16. The system of claim 11, wherein the fourth layer comprises at least one of:

identifying the labeled entity in an entry of a high-confidence name data source and returning the entry;

identifying a candidate by fuzzy matching with the high-confidence name data source, the identifying of the candidate comprising:

determining respective edit distances between the labeled entity and respective entries from the high-confidence name data source;

ranking at least some of the respective entries from lowest to highest edit distance; and returning one or more highest-ranked previously-used names as the result used as the candidate; and returning the entry or the candidate as the result used as the predicted identifier.

17. The system of claim 11, wherein the processing further comprises:

receiving feedback from the UI element indicating that the predicted identifier is correct; and updating data associated with at least one of the previous transactions, previously-used names, and high-confidence names to improve a ranking of the result.

18. A method comprising:

extracting, by a processor, a transaction payload from a transaction processing system, the transaction payload comprising a labeled entity from a string describing a transaction associated with a user;

applying, by the processor, a layered entity resolution process to the transaction payload, the layered entity resolution process comprising performing processing of a plurality of successive layers until at least one of the layers produces a predicted identifier for the labeled entity, the processing of the plurality of successive layers comprising at least two of:

a first layer comprising processing the transaction payload comprising the labeled entity using a named entity recognition machine learning model configured to detect a name of the labeled entity by a process comprising:

identifying, by the processor, an exact match between the labeled entity and the name within the previous transactions, and returning, by the processor, the name as the result used as the predicted identifier, a second layer comprising processing the transaction payload comprising the labeled entity using a fuzzy matching algorithm configured to detect a fuzzy match to at least one of a plurality of previously-used names by a process comprising:

determining, by the processor, respective edit distances between the labeled entity and respective ones of the plurality of previously-used names, ranking, by the processor, at least some of the plurality of previously-used names from lowest to highest edit distance, and returning, by the processor, one or more highest-ranked previously-used names as the result used as the predicted identifier, a third layer comprising processing the transaction payload comprising the labeled entity using a fuzzy matching algorithm configured to detect a fuzzy match to a synonym for the labeled entity from previous transactions associated with the user including the synonym by a process comprising:

determining, by the processor, a synonymous description of the labeled entity, detecting, by the processor, at least one instance of the synonymous description in at least one of the previous transactions, and returning, by the processor, the synonymous description as the result used as the predicted identifier, and a fourth layer comprising searching a high-confidence name data source for at least one of a direct match and a fuzzy match between at least a portion of the string and a high-confidence name within the high-confidence data source by a process comprising at least one of:

identifying, by the processor, the labeled entity in an entry of a high-confidence name data source and returning the entry, and identifying, by the processor, a candidate by fuzzy matching with the high-confidence name data source, wherein the layered entity resolution process ends in response to the producing of the predicted identifier; and inserting, by the processor, the predicted identifier into a user interface (UI) element within a UI displayed to the user.

19. The method of claim 18, further comprising:

receiving, by the processor, the transaction payload; and labeling, by the processor, the labeled entity in the transaction payload.

20. The method of claim 18, further comprising:

receiving, by the processor, feedback from the UI element indicating that the predicted identifier is correct; and updating, by the processor, data associated with at least one of the previous transactions, previously-used names, and high-confidence names to improve a ranking of the result.

* * * * *